US012763806B2

(12) United States Patent
Cook et al.

(10) Patent No.: US 12,763,806 B2
(45) Date of Patent: Oct. 13, 2026

(54) POWER MODIFICATION OF TRANSMITTED SYMBOLS

(71) Applicant: Rampart Communications, Inc., Linthicum Heights, MD (US)

(72) Inventors: Jarriel D. Cook, Cheverly, MD (US); Daniel W. Chew, Charles Town, WV (US); Urban Hakansson, Annapolis, MD (US)

(73) Assignee: Rampart Communications, Inc., Linthicum Heights, MD (US)

( * ) Notice: Subject to any disclaimer, the term of this patent is extended or adjusted under 35 U.S.C. 154(b) by 224 days.

(21) Appl. No.: 18/809,453

(22) Filed: Aug. 20, 2024

(65) Prior Publication Data

US 2026/0058680 A1 Feb. 26, 2026

(51) Int. Cl.
*H04B 1/04* (2006.01)
*H04L 27/20* (2006.01)

(52) U.S. Cl.
CPC ....... *H04B 1/0475* (2013.01); *H04L 27/2014* (2013.01); *H04B 2001/0416* (2013.01)

(58) Field of Classification Search
CPC ........ H04B 7/0842; H04B 2201/70706; H04B 15/00; H04B 1/7107; H04B 10/541; H04B 1/7176; H04B 2001/7152; H04L 27/2634; H04L 27/265; H04L 27/2636
See application file for complete search history.

(56) References Cited

U.S. PATENT DOCUMENTS

| | | | |
|---|---|---|---|
| 10,833,749 B1 | 11/2020 | Robinson | |
| 11,641,269 B2 | 5/2023 | Robinson | |
| 11,936,770 B2 | 3/2024 | Robinson et al. | |
| 2021/0250075 A1* | 8/2021 | Robinson | H04B 7/0634 |

* cited by examiner

*Primary Examiner* — Tu X Nguyen
(74) *Attorney, Agent, or Firm* — Geoff D. Trotter

(57) ABSTRACT

A wireless transmitter mitigates the effect of nonlinearity in power amplifiers. The wireless transmitter obtains symbols encoding data to transmit wirelessly, and determines a total power to transmit the symbols. Each symbol includes a respective magnitude correlated to the power to transmit that data symbol. The wireless transmitter generates transformed symbols by applying a transformation to the symbols that lowers a Peak to Average Power Ratio (PAPR) for the transformed symbols by adjusting the respective magnitude of at least one transformed symbol. The wireless transmitter also generates rescaled symbols by adjusting the respective magnitude of each transformed symbol by a scaling factor, and transmits the rescaled symbols. The scaling factor preserves the total power to transmit the plurality of symbols.

20 Claims, 13 Drawing Sheets

100

500

800

POWER MODIFICATION OF TRANSMITTED SYMBOLS

TECHNICAL FIELD

The present disclosure relates to wireless networking, especially nonlinear power amplifiers for transmitting wireless data.

BACKGROUND

At the physical layer of a wireless transmission, a wireless transmitter may encode multiple bits into a symbol by varying the magnitude/phase of the transmitted signal between predetermined values. For instance, the amplitude of two orthogonal signals may be manipulated to define multiple symbols according to their In-phase (I) and Quadrature (Q) components as I-Q points in a Quadrature Amplitude Modulation (QAM) encoding scheme. A constellation of a particular QAM encoding scheme defines the possible symbol values, and determines the number of bits conveyed per symbol. For example, a 16-QAM encoding scheme includes 16 predefined symbols at different I-Q points, with each symbol corresponding to a different set of four bits.

DETAILED DESCRIPTION

Overview

Figure 1:
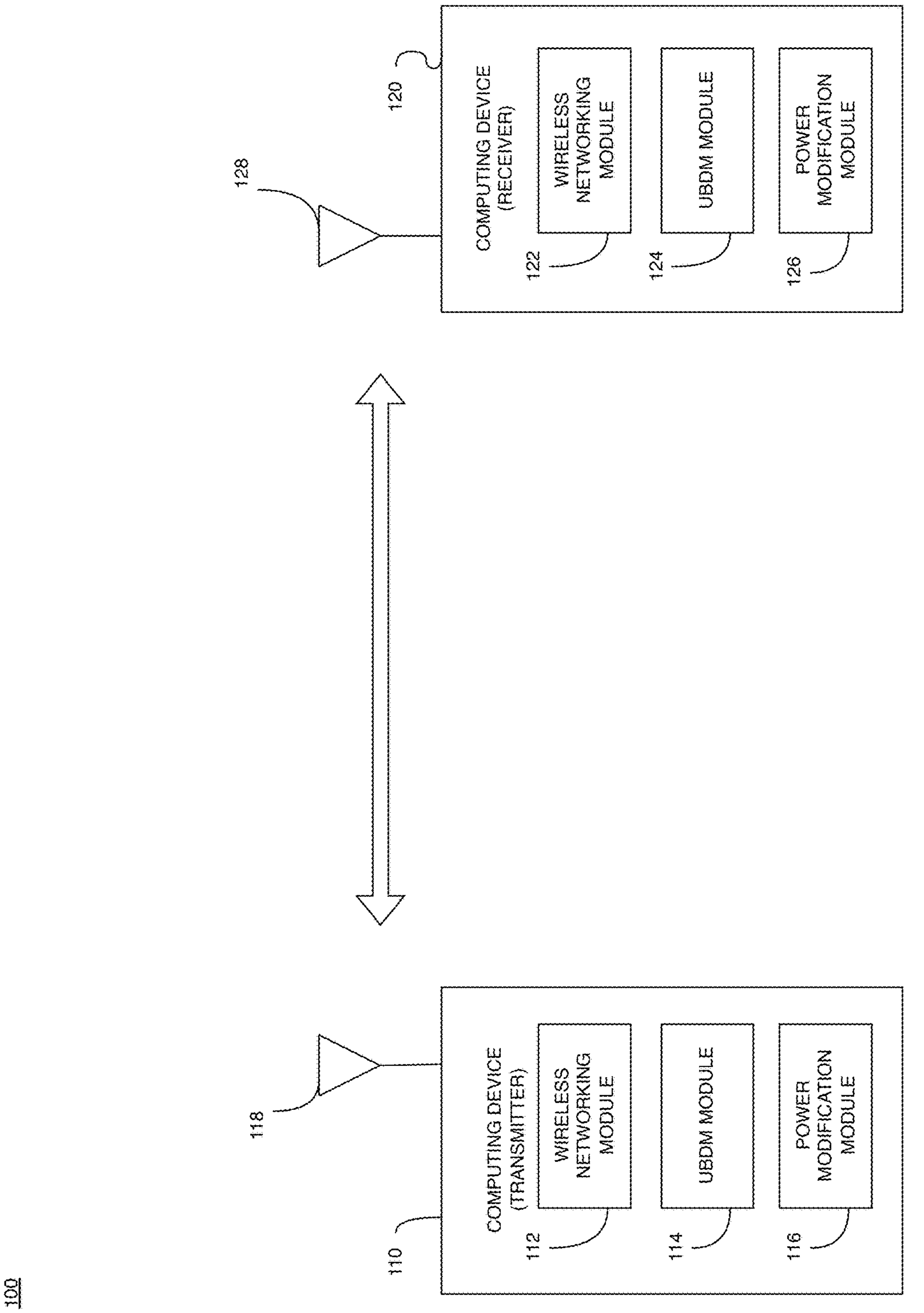
FIG. 1 is a simplified block diagram of a wireless network system configured to modify the power characteristics of wireless transmissions, according to an example embodiment.

A computer-implemented method is provided for mitigating the effect of nonlinearity in amplifiers of wireless devices. The method includes obtaining a plurality of symbols encoding data to transmit wirelessly, and determining a total power to transmit the plurality of symbols. Each symbol of the plurality of symbols includes a respective magnitude correlated to the power to transmit that data symbol. The method also includes generating a plurality of transformed symbols by applying a transformation to the plurality of symbols. The transformation lowers a Peak to Average Power Ratio (PAPR) for the plurality of transformed symbols by adjusting the respective magnitude of at least one transformed symbol among the plurality of transformed symbols. The method further includes generating a plurality of rescaled symbols by adjusting the respective magnitude of each transformed symbol in the plurality of transformed symbols by a scaling factor, and transmitting the plurality of rescaled symbols. The scaling factor preserves the total power to transmit the plurality of symbols.

DESCRIPTION OF EMBODIMENTS

Before transmission, wireless devices typically amplify the signals corresponding to the symbols using a power amplifier. However, physical power amplifiers may introduce additional distortion and noise into the transmitted signal. For instance, a power amplifier may have a nonlinear gain function that increases the magnitude unequally and/or adds a phase distortion to the transmitted signal.

Additionally, the wireless receiver may only receive a fraction of the power transmitted by the wireless transmitter, leading the wireless receiver to further amplify the received signal. The amplifier in the wireless receiver is typically a low noise amplifier, but may also introduce additional nonlinear distortions that may interfere with recovering the data symbols from the wireless transmission. The wireless receiver may not accurately decode the transmitted symbol if the distortion introduced by the amplifier(s) exceeds a certain threshold.

In some examples, a wireless receiver may be able to recover data from a noisy/distorted signal based on the encoding format (e.g., the constellation of symbols) of the wireless transmission. For instance, a first constellation (e.g., 4-QAM) may have predefined symbols with a larger separation than a second constellation (e.g., 256-QAM). The larger separation of the first constellation may allow the wireless receiver to recover data from a noisier wireless transmission than the second constellation would allow.

The techniques presented herein modify the distribution of the symbols in the I-Q plane to minimize the impact of nonlinear amplifier distortion. In one example, a transformation may decrease the peak power in exchange for increasing the average power and decreasing the Peak to Average Power Ratio (PAPR). Decreasing the PAPR of the wireless transmission enables amplifiers to function in a smaller operating range, and the gain of the amplifiers may be closer to linear over the smaller operating range.

Referring now to FIG. 1, a simplified block diagram illustrates an example of a network system 100 configured to communicate information securely between computing devices. The network system 100 includes a computing device 110, which may be also be referred to herein as a transmitter device. The computing device 110 includes a wireless networking module 112 that enables the computing device 110 to process communications signals and exchange information with other computing devices over a wireless network. The computing device 110 also includes a Unitary Braid Division Multiplexing (UBDM) module 114 that enables the computing device 110 to encode and decode a constellation of predefined symbols (e.g., 16-QAM) as a Gaussian distribution (e.g., via a UBDM transformation). The computing device 110 includes a power modification module 116 that enables the computing device 110 to modify the power characteristics of a wireless transmission according to the techniques described herein. The computing device 110 may further include an antenna 118 that enables the computing device 110 to transmit/receive wireless signals to/from other computing devices.

The network system 100 includes a computing device 120, which may be also be referred to herein as a receiver device. The computing device 120 includes a wireless networking module 122 that enables the computing device 120 to process communications signals and exchange information with other computing devices over a wireless network. The computing device 120 also includes a UBDM module 124 that enables the computing device 120 to encode and decode a constellation of predefined symbols (e.g., 16-QAM) as a Gaussian distribution (e.g., via a UBDM transformation). The computing device 120 includes a power modification module 126 that enables the computing device 120 to modify the power characteristics of a wireless transmission according to the techniques described herein. The computing device 120 may further include an antenna 128 that enables the computing device 120 to transmit/receive wireless signals to/from other computing devices.

In one example, the computing device 110 and/or computing device 120 may be embodied in a laptop computer, a desktop computer, a server, a network device, an Internet of Things (IoT) device, a mobile phone, a radio, any other wireless device, or an accessory device to any of the preceding devices. The computing devices 110 and 120 may be integrated into larger computing systems, such as a data center or cloud computing environment.

In another example, the wireless networking module 112 and the wireless networking module 122 may further include a software defined radio that enables the computing device 110 and the computing device 120, respectively, to adjust the parameters (e.g., frequency, amplitude, power, timing, etc.) of the wireless signals transmitted via the antenna 118 and the antenna 128.

In a further example, the computing device 110 and the computing device 120 may communicate via a computer network, such as a Local Area Network (LAN), a Wide Area Network (WAN), a private network, a Virtual Private Network (VPN), a Metropolitan Area Network (MAN), a Personal Area Network (PAN), a Wireless LAN (WLAN), a Wireless WAN (WWAN), a cellular network, and/or combinations thereof. The computer network between the computing device 110 and the computing device 120 may include segments over wired and/or wireless channels, such as Radio Frequency (RF) channels, Extremely Low Frequency (ELF) channels, Ultra Low Frequency (ULF) channels, Low Frequency (LF) channels, Medium Frequency (MF) channels, High Frequency (HF) channels, Very High Frequency (VHF) channels, Ultra High Frequency (UHF) channels, Extremely High Frequency (EHF) channels, and/or satellite channels. The computer network between the computing device 110 and the computing device 120 may also include one or more segments over optical networks (e.g., based on Synchronous Optical Networking (SONET), Synchronous Digital Hierarchy (SDH), or Optical Transport Network (OTN) protocols).

Figure 2:
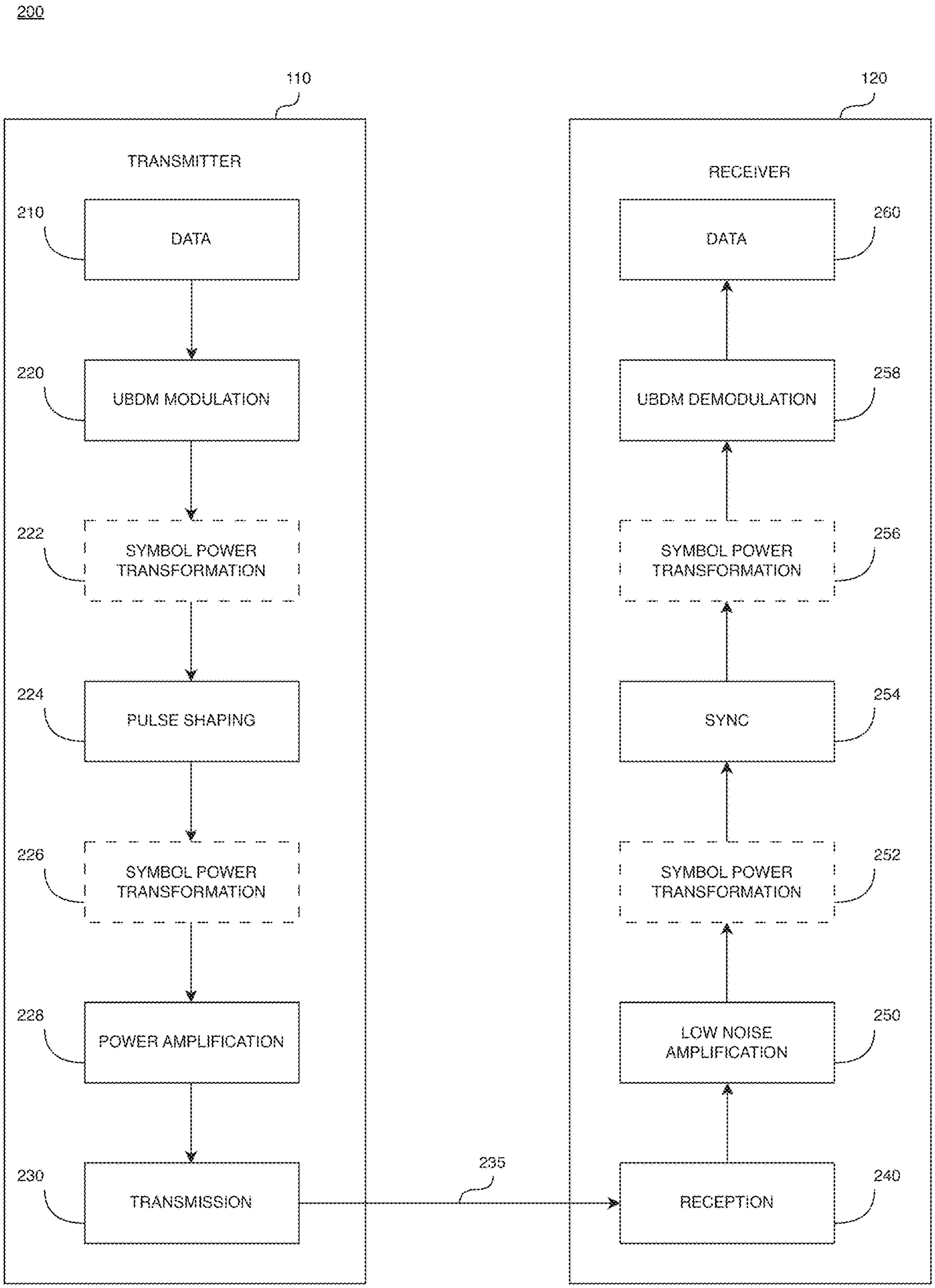
FIG. 2 is a simplified block diagram of a signal chain for transmitting and receiving data wirelessly transmitted from a transmitter device to a receiver device, according to an example embodiment.

Referring now to FIG. 2, a simplified block diagram illustrates one example of a transmit/receive chain 200 between the transmitter device 110 and the receiver device 120. The transmit/receive chain 200 serves to communicate input data 210 from the transmitter device 110 to the receiver device 120. The transmitter device 110 performs a UBDM modulation 220 on the input data 210. In one example, the UBDM modulation 220 transforms a block of symbols encoding the input data 210 in one format (e.g., 16-QAM) into a block of symbols with a Gaussian distribution in the complex I-Q plane.

The transmitter device 110 may apply a first symbol power transformation 222, as described hereinafter, to rearrange the symbols from the UBDM modulation 220. In one example, the first symbol power transformation 222 may transform the symbols from the UBDM modulation 220 into a block of symbols with different individual power characteristics, while maintaining the overall power output of the block of symbols from the UBDM modulation 220. In other words, the first symbol power transformation 222 may move individual symbols around the I-Q plane, but the total magnitude of all of the symbols (i.e., the total power to transmit the block of symbols) may remain the same.

The transmitter device 110 continues the transmit/receive chain 200 with pulse shaping 224 that mitigates issues with transmitting in a band limited channel. In one example, the pulse shaping 224 mitigates Inter-Symbol Interference (ISI) arising from transmitting symbols that are both time-limited and frequency-limited. For instance, the pulse shaping 224 may be implemented with a sinc filter configured to overlap zero crossing points between adjacent symbols. Alternatively, the pulse shaping 224 may be implemented with a raised-cosine filter or a Gaussian filter.

The transmitter device 110 may apply a second symbol power transformation 226 after the pulse shaping 224. The second symbol power transformation 226 may include similar transformations to the first symbol power transformation 222, as described hereinafter. In other words, the transmitter device 110 may apply a power modification either before the pulse shaping 224 (i.e., the first symbol power transformation 222), after the pulse shaping 224 (i.e., the second symbol power transformation 226), or both.

The transmit/receive chain 200 continues with power amplification 228 in preparation for transmission 230 through the transmission channel 235. In one example, the transmitter device 110 performs the power amplification 228 with a power amplifier that introduces magnitude nonlinearity and/or phase nonlinearity to the data signal. The first symbol power transformation 222 and the second symbol power transformation 226 mitigate the distortion of the data signal that is introduced by the power amplification 228.

After the transmission 230 of the data signal by the transmitter device 110 through the transmission channel 235, the transmit/receive chain 200 continues with the reception 240 by the receiver device 120. The reception 240 by the receiver device 120 includes the data signal transmitted by the transmitter device 110 as well as noise from the transmission channel 235. In one example, the transmission channel 235 may introduce Additive White Gaussian Noise (AWGN) to the transmitted data signal. Alternatively, the transmission channel 235 may add noise with spectral properties.

After reception 240, the receiver device 120 performs a low noise amplification 250 to amplify the data signal without contributing significantly more noise to the signal. However, the low noise amplification 250 may still add some distortion, which may be mitigated by the first symbol power transformation 222 and/or the second symbol power transformation 226.

To begin to recover the data from the received data signal, the receiver device 120 performs a third symbol power transformation 252 that reverses the second symbol power transformation 226. After the third symbol power transformation 252, the receiver device 120 performs a synchronization 254 to recover the timing of the received data signal. The receiver device 120 may also perform a fourth symbol power transformation 256 after the synchronization 254. In other words, the receiver device 120 may reverse the first symbol power transformation 222 and/or the second symbol power transformation 226 by applying a transformation either before (i.e., third symbol power transformation 252) the synchronization 254, after (i.e., the fourth symbol power transformation 256) the synchronization 254, or both. Alternatively, the receiver device 120 may skip the third symbol power transformation 252 and the fourth symbol power transformation 256. For instance, the format of the first symbol power transformation 222 and/or the second symbol power transformation 226 may allow the receiver device 120 to recover the symbols of the data signal without the third symbol power transformation 252 or the fourth symbol power transformation 256.

The transmit/receive chain 200 continues with UBDM demodulation 258 that reverses the UBDM modulation 220 performed by the transmitter device 110. The receiver device 120 recovers the output data 260, which should match the input data 210 from the output of the UBDM demodulation 258. In one example, the output data 260 encodes data in a constellation of I-Q data points defined by a standard format (e.g., 16-QAM).

Figure 3A:
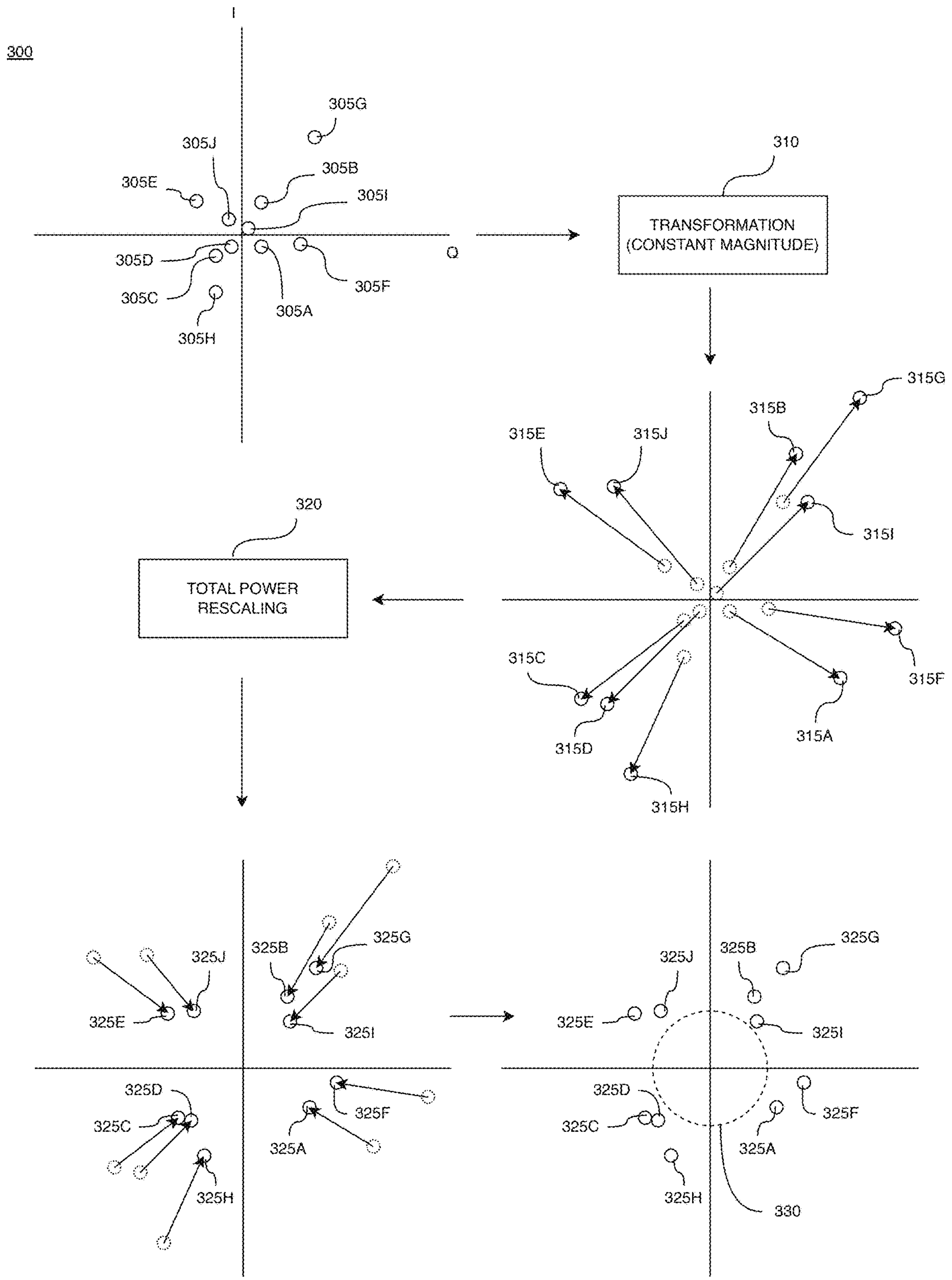
FIG. 3A illustrates the transformation of a plurality of data symbols by adding a constant magnitude to each symbol, according to an example embodiment.

Referring now to FIG. 3A, a series of I-Q plots 300 illustrate one example of a symbol power transformation (e.g., first symbol power transformation 222 or second symbol power transformation 226) based on a predetermined magnitude value. The initial I-Q plot includes data symbols 305A-305J scattered in roughly a two-dimensional Gaussian distribution around the I-Q plane. In one example, the data symbols 305A-305J are a block of data symbols produced by a UBDM modulation of a standard modulation constellation (e.g., Phase Shift Keying (PSK), QAM, etc.).

The transformation 310 adds a constant magnitude of a predetermined value to each of the data symbols 305A-305J to generate corresponding transformed symbols 315A-315J. As shown in FIG. 3A, the predetermined magnitude value corresponds to a radial vector with a predetermined length, which is added to each data symbol 305A-305J. In other words, the transformation 310 adds to the magnitude of each data symbol 305A-305J, but does not change the phase (i.e., the angle in the I-Q plot) of each data symbol 305A-305J.

The transformed data symbols 315A-315J undergo a total power rescaling 320 to generate rescaled data symbols 325A-325J. The total power rescaling 320 reduces the magnitude of each of the transformed data symbols 315A-315J by a predetermined factor of the magnitude of the corresponding transformed data symbol 315A-315J. The total power rescaling 320 reduces the magnitude of each of the transformed data symbols 315A-315J by a scaling factor that depends on the individual magnitude of the transformed data symbols 315A-315J. In other words, the total power rescaling 320 reduces the magnitude of each of the transformed data symbols 315A-315J by a percentage amount instead of a fixed amount.

In one example, the total power rescaling 320 ensures that the total power (i.e., the total magnitude) of the rescaled data symbols 325A-325J matches the total power of the data symbols 305A-305J. By maintaining the same total power, a transmitter device (e.g., transmitter device 110) uses the same amount of energy to transmit the rescaled data symbols 325A-325J as it would to transmit the data symbols 305A-305J.

Increasing the magnitude of all of the data symbols 305A-305J by a predetermined value and rescaling the magnitude of each of the transformed data symbols 315A-315J by a scaling factor effectively creates a minimum magnitude value 330 for the rescaled data symbols 325A-325J while compressing the range of the magnitudes outside the minimum magnitude value 330. The total transformation shown in the series of I-Q plots 300 (i.e., transformation 310 and total power rescaling 320) increases the average power of the data symbols 305A-305J by more than the peak power (e.g., data symbol 305G in FIG. 3A), which reduces the PAPR of the data symbols 305A-305J. The lower PAPR mitigates the distortion of a nonlinear power amplifier by reducing the dynamic range required of the power amplifier.

Because the transformation 310 adds a predetermined magnitude value to every data symbol 305A-305J, the transmitter device may share the predetermined magnitude value with a receiver device (e.g., receiver device 120), either through the same communications channel or a separate communications channel. In one example, the receiver device may reverse the total power rescaling 320 and the transformation 310 based on the shared predetermined magnitude value, and recover the original data symbols 305A-305J. Alternatively, the receiver device may attempt to recover data from the received data symbols without explicitly reversing the transformation 310, but the signal would include some distortion based on the transformation 310. However, the receiver device may recover data symbols that may be correlated with the transmitted data (e.g., via quantization of the data symbols, via forward error correction, etc.) despite the added distortion.

Figure 3B:
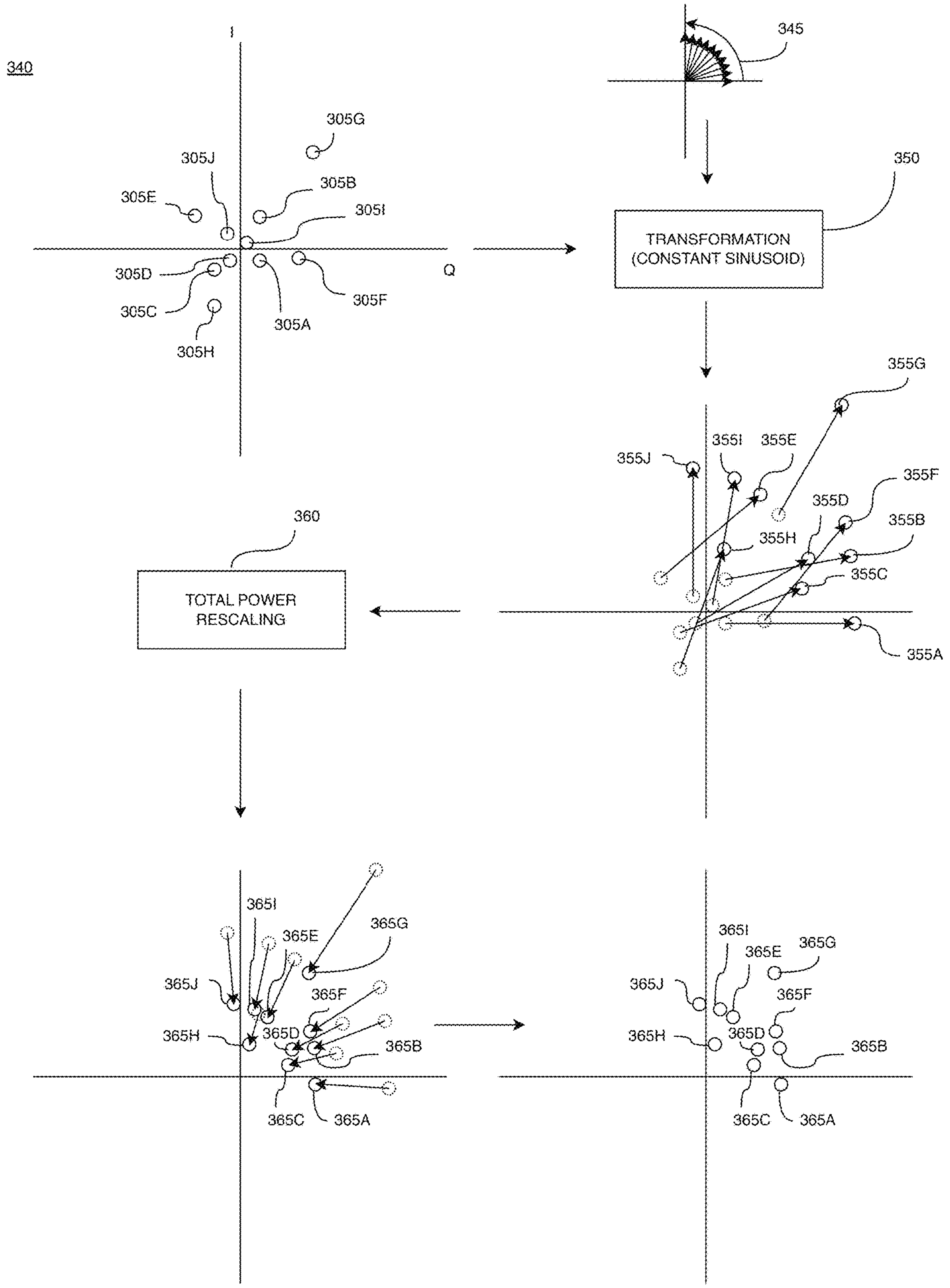
FIG. 3B illustrates the transformation of a plurality of data symbols by adding a constant sinusoid to the transmitted signal, according to an example embodiment.

Referring now to FIG. 3B, a series of I-Q plots 340 illustrate another example of a symbol power transformation (e.g., first symbol power transformation 222 or second symbol power transformation 226) based on a constant sinusoid signal 345 with a predetermined magnitude and frequency. The constant sinusoid signal 345 is represented in the I-Q plane as a sequence of vectors that rotate around the origin in a clockwise direction. The predetermined magnitude of the constant sinusoid signal 345 is represented by the vectors having the same length and tracing out a circle around the origin of the I-Q plot. The predetermined frequency of the constant sinusoid is represented by the vectors rotating around the origin of the I-Q plot at a constant rate.

As with FIG. 3A, the initial I-Q plot includes data symbols 305A-305J scattered in roughly a two-dimensional Gaussian distribution around the I-Q plane. In one example, the data symbols 305A-305J are a block of data symbols produced by a UBDM modulation of a standard modulation constellation (e.g., PSK, QAM, etc.).

The transformation 350 adds one of the vectors of the constant sinusoid signal 345 to each of the data symbols 305A-305J to generate corresponding transformed symbols 355A-355J. As shown in FIG. 3B, the transformation 350 adds the first vector of the constant sinusoid signal 345 (e.g., parallel to the positive Q-axis) to the first data symbol 305A to generate the corresponding transformed symbol 355A. Similarly, the transformation 350 adds the second vector of the constant sinusoid signal 345 (e.g., 9° above the positive Q-axis) to the second data symbol 305B to generate the corresponding transformed data symbol 355B. The transformation 350 continues adding subsequent vectors from the constant sinusoid signal 345 to the data symbols 305C-305J to generate the corresponding transformed data symbols 355C-355J.

The transformed data symbols 355A-355J undergo a total power rescaling 360 to generate rescaled data symbols 365A-365J. The total power rescaling 360 reduces the magnitude of each of the transformed data symbols 355A-355J by a predetermined factor of the magnitude of the corresponding transformed data symbol 355A-355J. The total power rescaling 360 reduces the magnitude of each of the transformed data symbols 355A-355J by a scaling factor that depends on the individual magnitude of the transformed data symbols 355A-355J. In other words, the total power rescaling 360 reduces the magnitude of each of the transformed data symbols 355A-355J by a percentage amount.

In one example, the total power rescaling 360 ensures that the total power (i.e., the total magnitude) of the rescaled data symbols 365A-365J matches the total power of the data symbols 305A-305J. By maintaining the same total power, a transmitter device (e.g., transmitter device 110) uses the same amount of energy to transmit the rescaled data symbols 365A-365J as it would to transmit the data symbols 305A-305J.

The total transformation shown in the series of I-Q plots 340 (i.e., transformation 350 and total power rescaling 360) increases the average power of the data symbols 305A-305J by more than the peak power (e.g., data symbol 305G in FIG. 3A), which reduces the PAPR of the data symbols 305A-305J. The lower PAPR mitigates the distortion of a nonlinear power amplifier by reducing the dynamic range required of the power amplifier.

Because the transformation 350 adds a predetermined sinusoid to every data symbol 305A-305J, the transmitter device may share the predetermined sinusoid (e.g., the amplitude and frequency) with a receiver device (e.g., receiver device 120), either through the same communications channel or a separate communications channel. In one example, the receiver device may reverse the total power rescaling 360 and the transformation 350 based on the shared predetermined sinusoid, and recover the original data symbols 305A-305J.

Figure 3C:
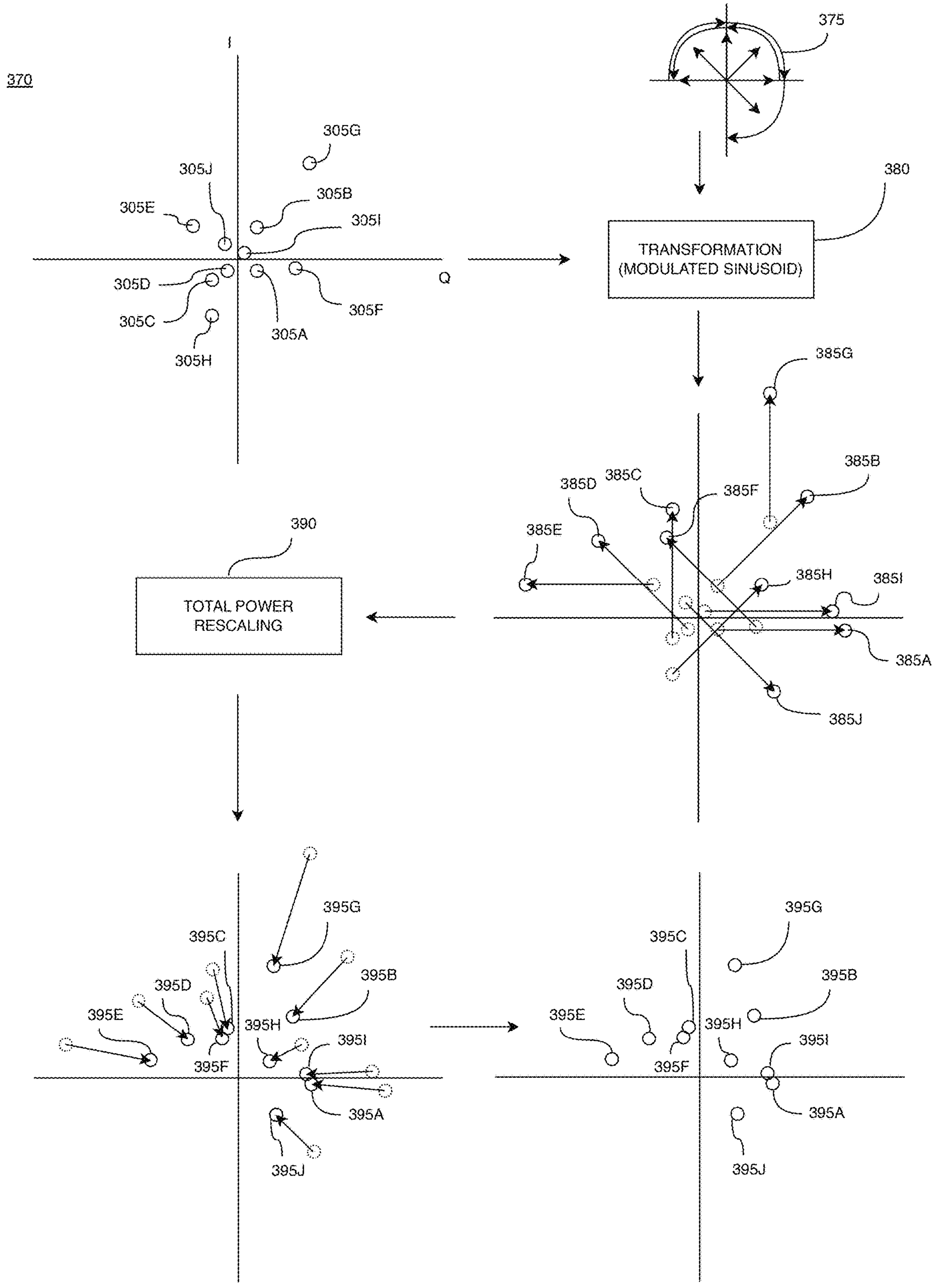
FIG. 3C illustrates the transformation of a plurality of data symbols by adding a modulated sinusoid to the transmitted signal, according to an example embodiment.

Referring now to FIG. 3C, a series of I-Q plots 370 illustrate another example of a symbol power transformation (e.g., first symbol power transformation 222 or second symbol power transformation 226) based on a modulated sinusoid signal 375 that carries information. The modulated sinusoid signal 375 is represented in the I-Q plane as a sequence of vectors that rotate around the origin based on the message being encoded in the sinusoid. For instance, the modulated sinusoid signal 375 may be encoded according to a Minimum Shift Keying (MSK) format in which the data of the modulated sinusoid signal 375 is represented by a change in the rotation direction of the sequence of vectors.

As with FIG. 3A and FIG. 3B, the initial I-Q plot includes data symbols 305A-305J scattered in roughly a two-dimensional Gaussian distribution around the I-Q plane. In one example, the data symbols 305A-305J are a block of data symbols produced by a UBDM modulation of a standard modulation constellation (e.g., PSK, QAM, etc.).

The transformation 380 adds one of the vectors of the modulated sinusoid signal 375 to each of the data symbols 305A-305J to generate corresponding transformed symbols 375A-375J. As shown in FIG. 3C, the transformation 380 adds the first vector of the modulated sinusoid signal 375 (e.g., parallel to the positive Q-axis) to the first data symbol 305A to generate the corresponding transformed symbol 385A. Similarly, the transformation 380 adds the second vector of the modulated sinusoid signal 375 (e.g., 45° above the positive Q-axis) to the second data symbol 305B to generate the corresponding transformed data symbol 385B. The transformation 380 continues adding subsequent vectors from the modulated sinusoid signal 375 to the data symbols 305C-305J to generate the corresponding transformed data symbols 385C-385J.

The transformed data symbols 385A-385J undergo a total power rescaling 390 to generate rescaled data symbols 395A-395J. The total power rescaling 390 reduces the magnitude of each of the transformed data symbols 385A-385J by a predetermined factor of the magnitude of the corresponding transformed data symbol 385A-385J. The total power rescaling 390 reduces the magnitude of each of the transformed data symbols 385A-385J by a scaling factor that depends on the individual magnitude of the transformed data symbols 385A-385J. In other words, the total power rescaling 390 reduces the magnitude of each of the transformed data symbols 385A-385J by a percentage amount.

In one example, the total power rescaling 390 ensures that the total power (i.e., the total magnitude) of the rescaled data symbols 395A-395J matches the total power of the data symbols 305A-305J. By maintaining the same total power, a transmitter device (e.g., transmitter device 110) uses the same amount of energy to transmit the rescaled data symbols 395A-395J as it would to transmit the data symbols 305A-305J.

The total transformation shown in the series of I-Q plots 370 (i.e., transformation 380 and total power rescaling 390) increases the average power of the data symbols 305A-305J by more than the peak power (e.g., data symbol 305G in FIG. 3A), which reduces the PAPR of the data symbols 305A-305J. The lower PAPR mitigates the distortion of a nonlinear power amplifier by reducing the dynamic range required of the power amplifier.

To recover the data symbols 305A-305J, a receiver device (e.g., receiver device 120) first demodulates the received signal corresponding to the rescaled data symbols 395A-395J and decodes the information from the modulated sinusoid signal 375. In one example, a transmitter device (e.g., transmitter device 110) may provide the receiver device with additional information contained in the modulated sinusoid signal 375. For instance, the modulated sinusoid signal 375 may encode information about the data symbols 305A-305J, such as parameters of an encoding and/or encryption algorithm. However, because the signal transmitted from the rescaled data symbols 395A-395J may be transmitted without further encryption, any information in the modulated sinusoid signal 375 may be intercepted by any device (e.g., an eavesdropper) that receives the transmitted signal. In one example, to protect the underlying encryption, only public information (e.g., encryption algorithm, starting nonce, public asymmetric key, etc.) may be encoded in the modulated sinusoid signal 375, while secure information (e.g., private asymmetric key, symmetric key, etc.) would be omitted from the modulated sinusoid signal 375.

Figure 4A:
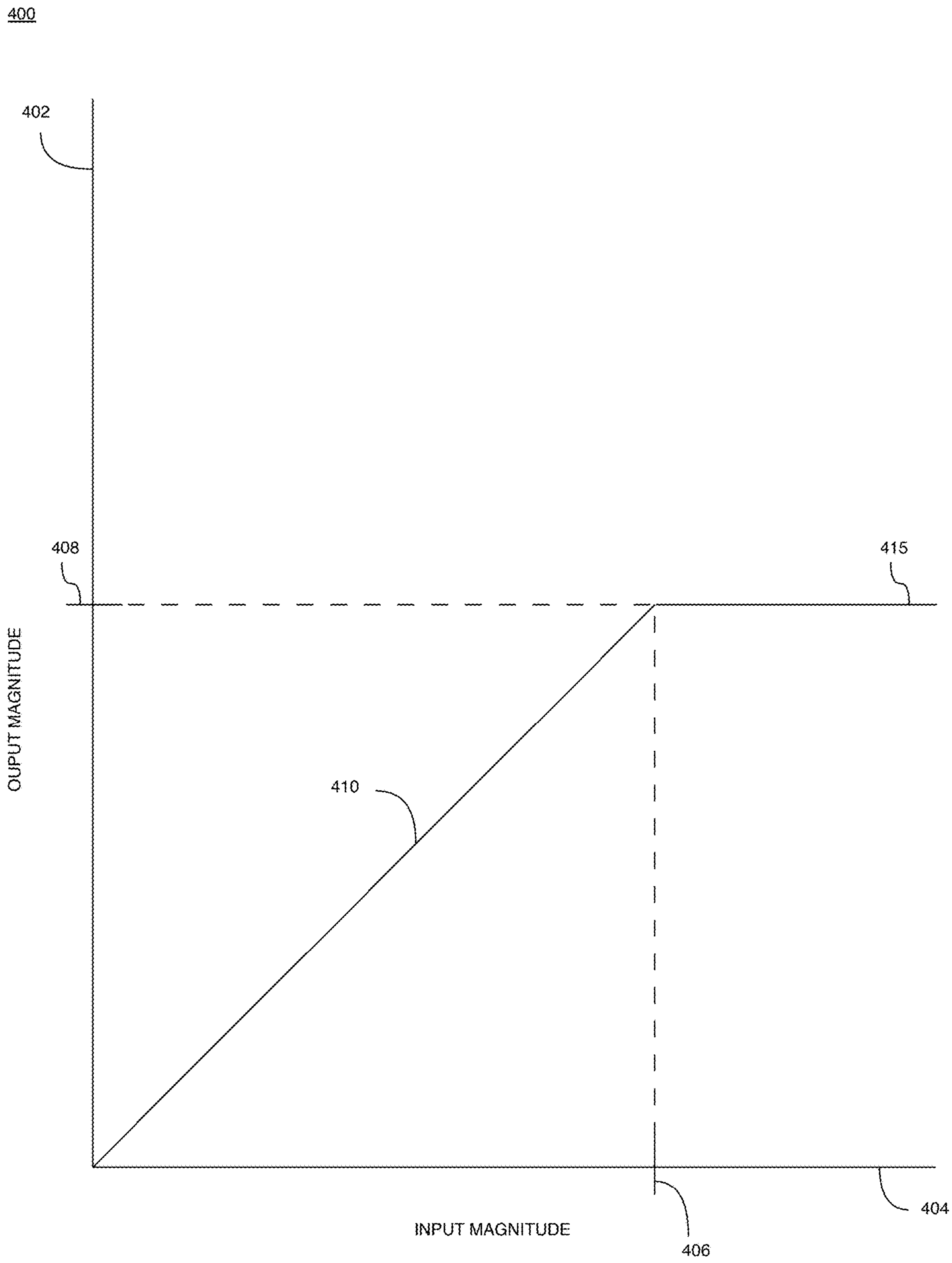
FIG. 4A illustrates a power shaping transformation that applies a hard limit to the magnitude of transmitted symbols, according to an example embodiment.

Referring now to FIG. 4A, a graph 400 illustrates one example of a power shaping transformation that applies a hard limit to the magnitude of data symbols. The graph 400 plots the gain of the hard limit transformation along an output magnitude axis 402 and an input magnitude axis 404. The hard limit is imposed at a reference input magnitude 406 above which the output magnitude is limited to a reference output magnitude 408. In one example, the reference input magnitude 406 is equal to the reference output magnitude 408.

The graph 400 plots the gain of the hard limit transformation in two regions. A linear region 410 describes the hard limit transformation when the input signal has an input magnitude below the reference input magnitude 406. A clipping region 415 describes the hard limit transformation with the input signal has an input magnitude above the reference input magnitude 406.

For the example in which the reference input magnitude 406 equals the reference output magnitude 408, the linear region 410 has a unit slope such that the input magnitude of each data symbol is equal to the output magnitude of the data symbol. In other words, each particular data symbol is unchanged if the magnitude of the particular data symbol is at or below the reference input magnitude. If the magnitude of a particular data symbol exceeds the reference input magnitude 406, then the magnitude of that particular data symbol is clipped to the reference output magnitude 408.

Figure 4B:
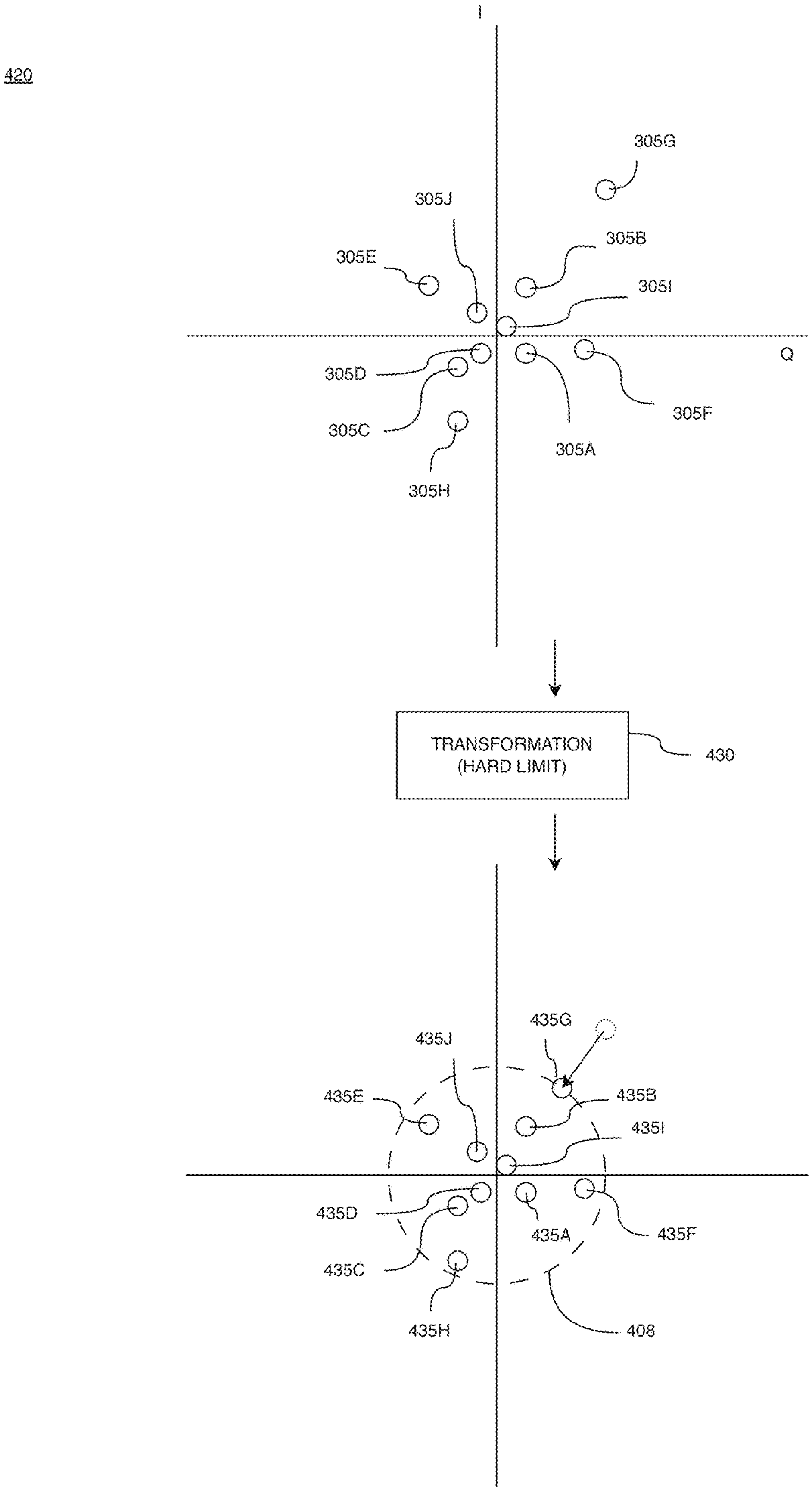
FIG. 4B illustrates the transformation of a plurality of data symbols by applying a hard limit to the magnitude of the data symbols, according to an example embodiment.

Referring now to FIG. 4B, a pair of I-Q plots 420 illustrate how a power shaping transformation applies a hard limit to a set of data symbols 305A-305J. The set of data symbols 305A-305J are scattered in roughly a two-dimensional Gaussian distribution around the I-Q plane. In one example, the data symbols 305A-305J are a block of data symbols produced by a UBDM modulation of a standard modulation constellation (e.g., PSK, QAM, etc.).

A transmitter device (e.g., transmitter device 110) applies a hard limit transformation 430 to the set of data symbols 305A-305J to generate the transformed set of data symbols 435A-435J. The transformed set of data symbols 435A-435J reduces the PAPR of the data transmission by reducing the magnitude of the data symbol 305G, which has the highest power of the set of data symbols 305A-305J, to the reference output magnitude 408.

In the example shown in FIG. 4A and FIG. 4B, the data symbols 305A-305F, and 305H-305J each have a magnitude less than the reference output magnitude 408, and the hard limit transformation 430 leaves those data symbols unchanged. The hard limit transformation 430 generates data symbols 435A-435F and 435H-435J to be unchanged from the corresponding data symbols 305A-305F and 305H-305J. In other words, the hard limit transformation 430 only clips the power of the peak power data symbol 305G to generate the output data symbol 435G with a magnitude equal to the reference output magnitude 408.

In another example, the hard limit transformation 430 may be applied to each component (e.g., I and Q) separately, and the reference output magnitude 408 would be a square in the I-Q plane. If the data symbols 305A-305J are stored as Cartesian coordinates (e.g., I, Q points) instead of polar coordinates (e.g., R,θ points), then the processing circuitry of the transmitter device may be able to apply the hard limit transformation 430 using faster and/or using fewer resources.

Because the hard limit transformation 430 does not preserve the magnitude information of the clipped data symbols (e.g., data symbol 305G), a receiver device (e.g., receiver device 120) relies on recovering the underlying data of the received data symbols without reversing the hard limit transformation 430. The receiver device may still recover the underlying data if the distortion introduced by the hard limit transformation 430 remains small enough to be handled by signal processing (e.g., quantization, forward error correction, etc.) at the receiver device.

Figure 5A:
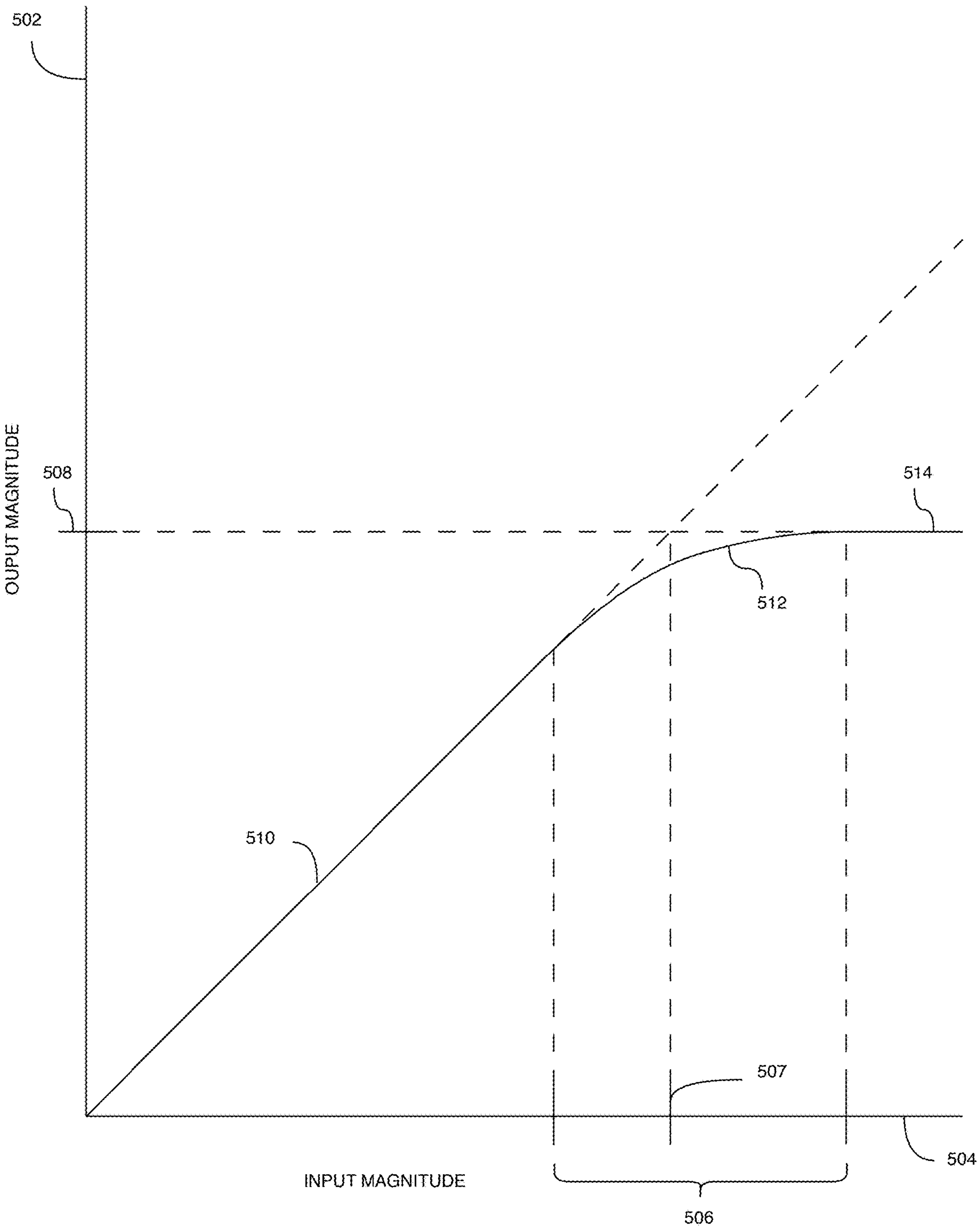
FIG. 5A illustrates a power shaping transformation that applies a soft limit to the magnitude of transmitted symbols, according to an example embodiment.

Referring now to FIG. 5A, a graph 500 illustrates one example of a power shaping transformation that applies a soft limit to the magnitude of data symbols. The graph 500 plots the gain of the soft limit transformation along an output magnitude axis 502 and an input magnitude axis 504. Unlike the hard limit described with respect to FIG. 4A, the soft limit transformation smoothly transitions from a linear gain to a zero gain over a range 506 of input magnitude values that surrounds a reference input magnitude 507. If the input magnitude of a particular data symbol exceeds the range 506, the soft limit transformation clips the output magnitude of that particular data symbol to the maximum output magnitude 508.

The soft limit transformation includes a linear region 510, a transition region 512, and a clipped region 514. In the linear region 510, e.g., when the input magnitude is lower than the range 506 of input magnitudes around the reference input magnitude 507, the output magnitude of a data symbol is equal to the input magnitude of the data symbol. In the transition region 512, e.g., when the input magnitude is within the range 506 around the reference input magnitude 507, the output magnitude of a data symbol is less than the input magnitude of the data symbol. In the clipped region 514, e.g., when the input magnitude is higher than the range 506 around the reference input magnitude 507, the output magnitude is held at a constant value of the maximum output magnitude 508.

In one example, the gain of the soft limit transformation in the transition region 512 may be mathematically defined (e.g., parabola, hyperbola, or other well-defined function) over the range 506 of input magnitude values. Alternatively, the gain of the soft limit transformation in the transition region 512 may be defined at a limited number of predetermined points in the range 506 (e.g., a lookup table may be used), and a transmitter device (e.g., transmitter device 110) may interpolate to determine the output magnitude of data symbols with an input magnitude between the predetermined points.

Figure 5B:
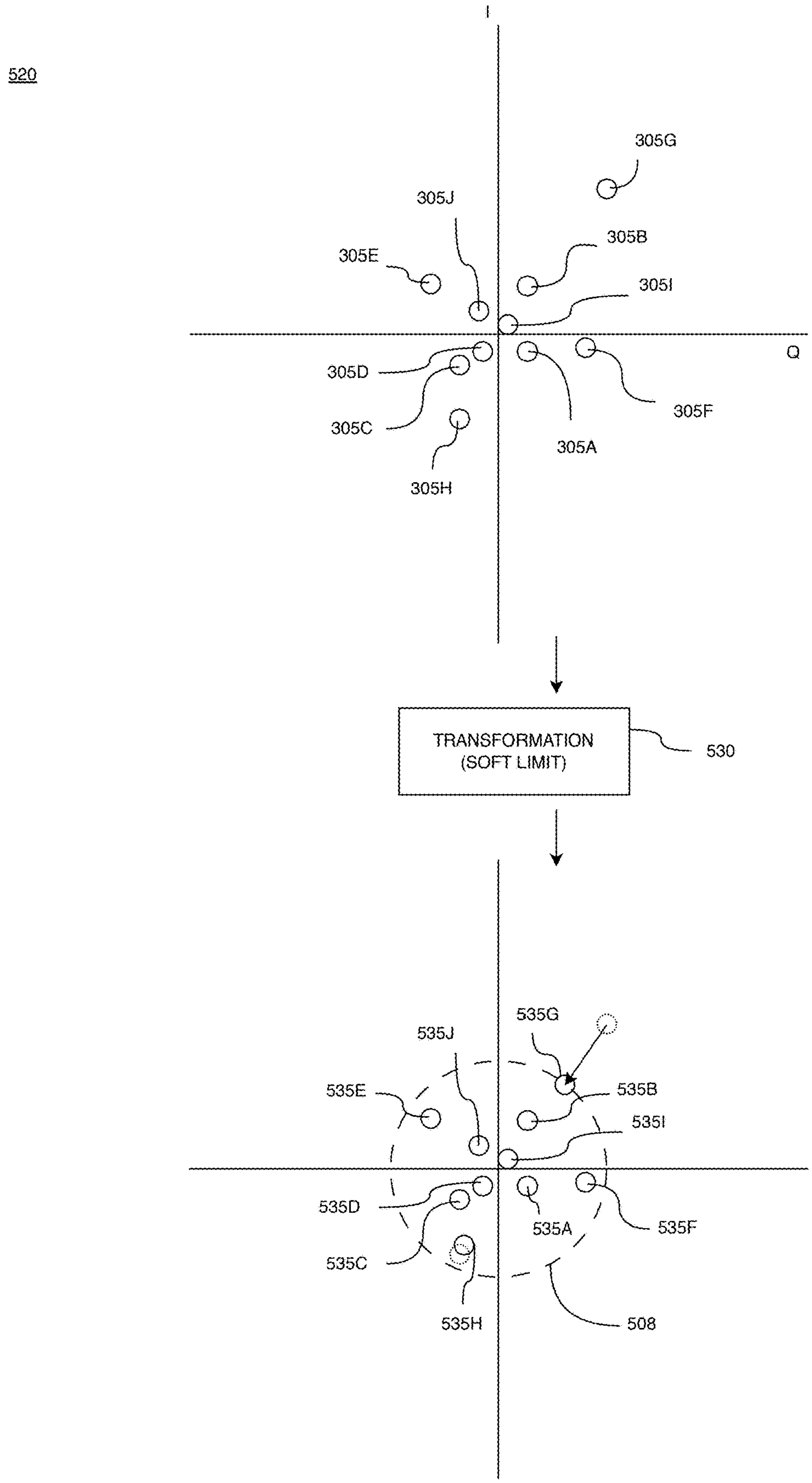
FIG. 5B illustrates the transformation of a plurality of data symbols by applying a soft limit to the magnitude of the data symbols, according to an example embodiment.

Referring now to FIG. 5B, a pair of I-Q plots 520 illustrate how a power shaping transformation applies a soft limit to a set of data symbols 305A-305J. The set of data symbols 305A-305J are scattered in roughly a two-dimensional Gaussian distribution around the I-Q plane. In one example, the data symbols 305A-305J are a block of data symbols produced by a UBDM modulation of a standard modulation constellation (e.g., PSK, QAM, etc.).

A transmitter device (e.g., transmitter device 110) applies a soft limit transformation 530 to the set of data symbols 305A-305J to generate the transformed set of data symbols 535A-535J. The transformed set of data symbols 535A-535J reduces the PAPR of the data transmission by reducing the magnitude of the data symbol 305G, which has the highest power of the set of data symbols 305A-305J, to the maximum output magnitude 508.

In the example shown in FIG. 5A and FIG. 5B, the data symbols 305A-305F, 305I, and 305J each have an input magnitude less than the range 506 of input magnitude, and the linear region 510 of the soft limit transformation 530 leaves those data symbols unchanged. The linear region 510 of the soft limit transformation 530 generates data symbols 535A-535F, 535I, and 535J to be unchanged from the corresponding data symbols 305A-305F, 305I, and 305J. The data symbol 305G has an input magnitude higher than the range 506 of input magnitudes, and the clipped region 514 of the soft limit transformation 530 sets the output magnitude of the corresponding data symbol 535G to be equal to the maximum output magnitude 508. The data symbol 305H has an input magnitude within the range 506 of input magnitudes, and the transition region 512 of the soft limit transformation 530 lowers the output magnitude of the corresponding data symbol 535H to be less than the magnitude of the original data symbol 305H.

In another example, the soft limit transformation 530 may be applied to each component (e.g., I and Q) separately, and the maximum output magnitude 508 would be a square in the I-Q plane. If the data symbols 305A-305J are stored as Cartesian coordinates (e.g., I, Q points) instead of polar coordinates (e.g., R,θ points), then the processing circuitry of the transmitter device may be able to apply the soft limit transformation 530 using faster and/or using fewer resources.

Because the soft limit transformation 530 does not preserve the magnitude information of the transformed data symbols (e.g., data symbol 305G and data symbol 305H), a receiver device (e.g., receiver device 120) relies on recovering the underlying data of the received data symbols without reversing the soft limit transformation 530. The receiver device may still recover the underlying data if the distortion introduced by the soft limit transformation 530 remains small enough to be handled by signal processing (e.g., quantization, forward error correction, etc.) at the receiver device.

Figure 6A:
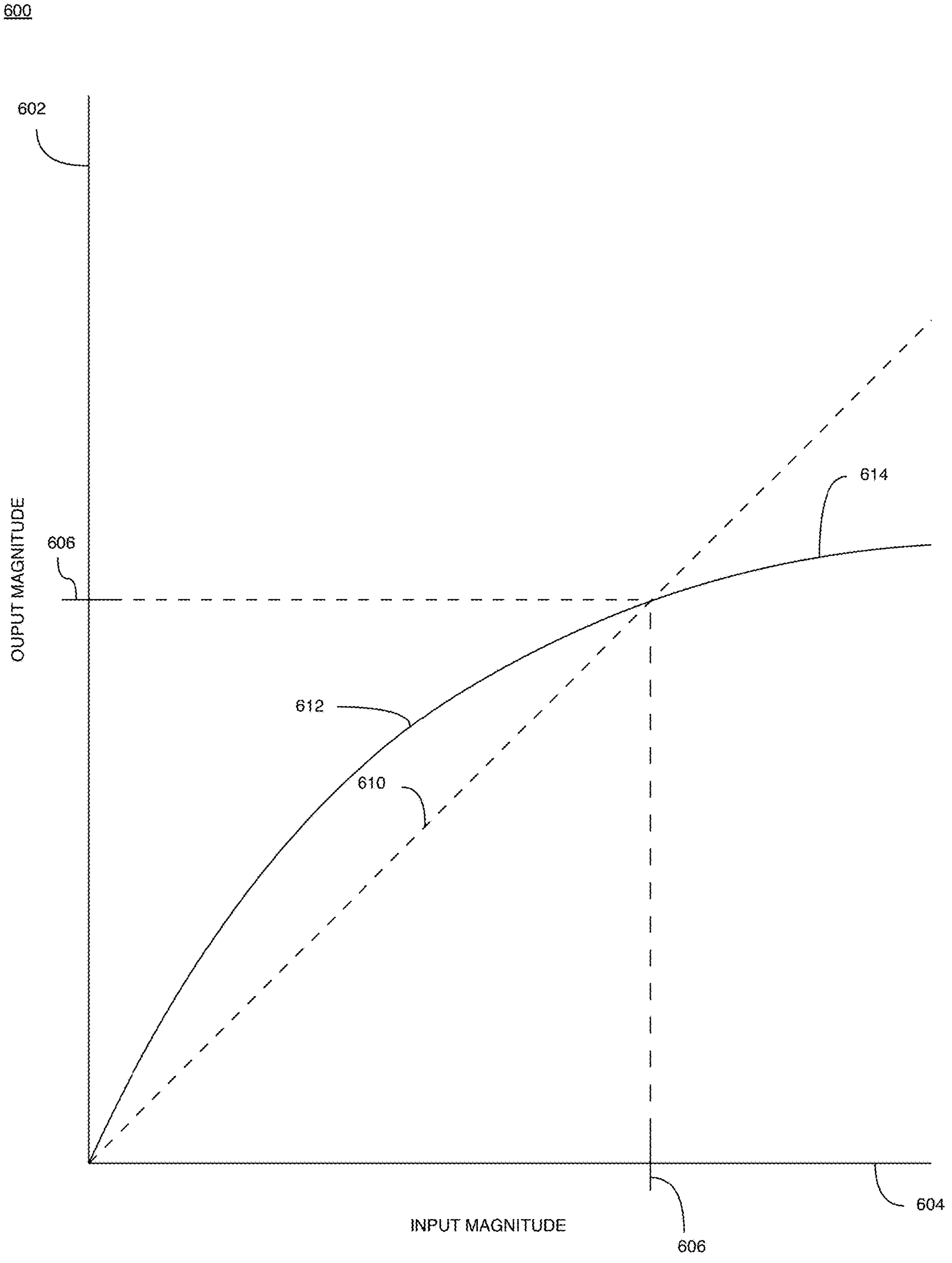
FIG. 6A illustrates a power shaping transformation that applies a companding transformation to the magnitude of transmitted symbols, according to an example embodiment.

Referring now to FIG. 6A, a graph 600 illustrates a power shaping transformation that applies a companding transformation to the magnitude of data symbols. The graph 600 plots the gain of the companding transformation along an output magnitude axis 602 and an input magnitude axis 604. The companding transformation increases the magnitude of data symbols with an input magnitude below a reference magnitude 606 and decreases the magnitude of data symbols with an input magnitude above the reference magnitude 606. A data symbol with an input magnitude equal to the reference magnitude 606 remains unchanged by the companding transformation, and has an output magnitude that is equal to the reference magnitude 606.

The graph 600 illustrates the companding transformation with reference to a linear gain line 610 with a unit gain. In other words, data symbols that fall on the linear gain line 610 would have the same output magnitude as their respective input magnitude. The companding transformation includes a first region 612 that increases the output magnitude of data symbols with input magnitude values below the reference magnitude 606. The companding transformation also includes a second region 614 that decreases the output magnitude of data symbols with input magnitude values above the reference magnitude 606. In other words, the first region 612 of the companding transformation falls above the linear gain line 610, and the second region 614 of the companding transformation falls below the linear gain line 610. The companding transformation shown in FIG. 6A crosses the linear gain line 610 at the reference magnitude 606.

The first region 612 of the companding transformation effectively increases the average power of a sequence of data symbols, and the second region effectively decreases the peak power of the sequence of data symbols. Both the first region 612 and the second region 614 function to lower the PAPR of the sequence of data symbols by compressing the data symbols toward the reference magnitude 606. In one example, the magnitude of the output data symbols may be rescaled to maintain the same average power for transmitting a sequence of data symbols. In this example, the companding transformation may lower the PAPR of the sequence of data symbols primarily through a reduction in peak power.

In one example, the gain of the companding transformation may be mathematically defined (e.g., with a parabolic function or a hyperbolic tangent function). Alternatively, the gain of the companding transformation may be defined at a limited number of predetermined points (e.g., a lookup table), and a transmitter device (e.g., transmitter device 110) may interpolate to determine the output magnitude of data symbols with an input magnitude between the predetermined points.

Figure 6B:
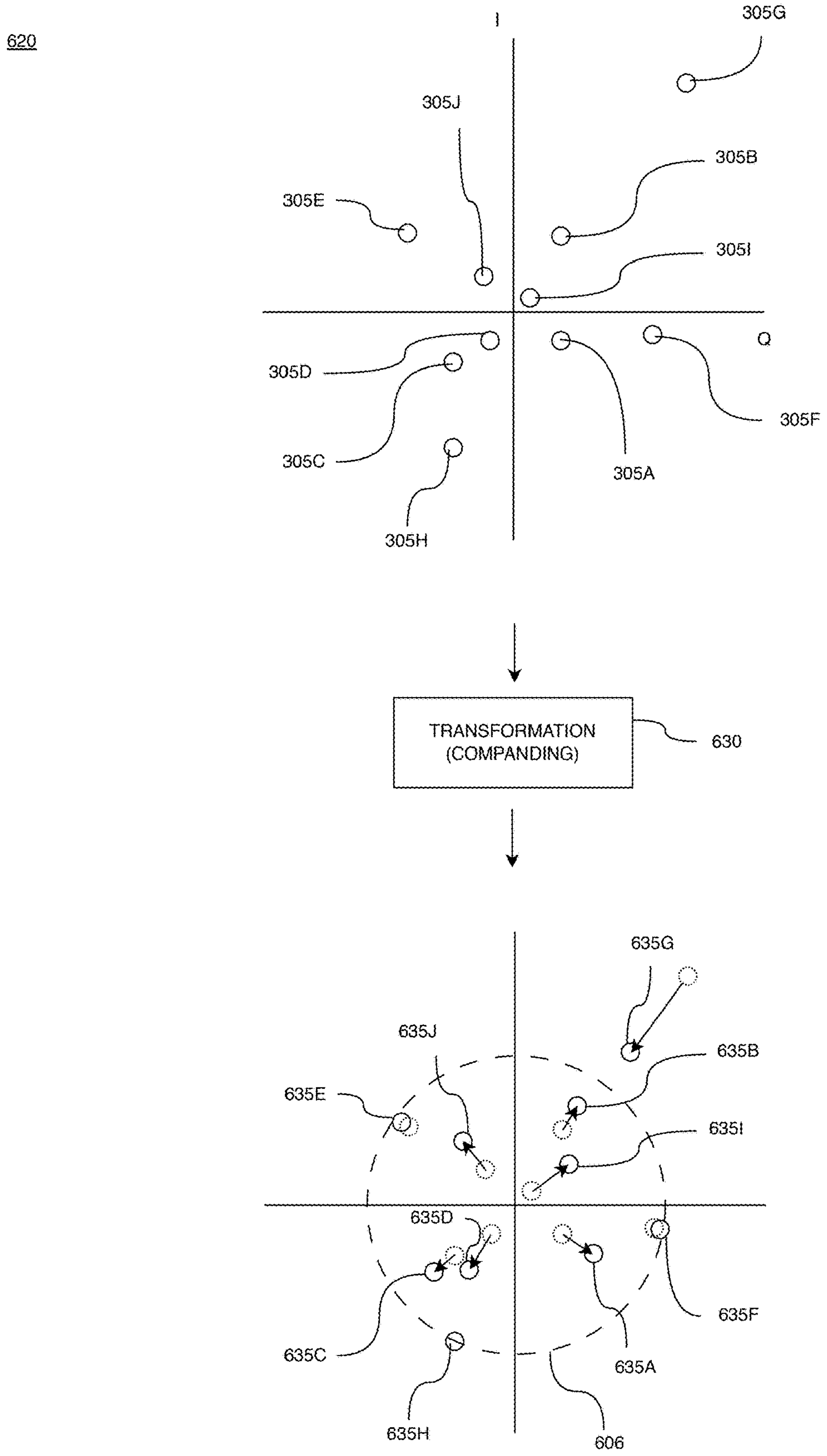
FIG. 6B illustrates the transformation of a plurality of data symbols by applying a companding transformation to the magnitude of the data symbols, according to an example embodiment.

Referring now to FIG. 6B, a pair of I-Q plots 620 illustrate how a transmitter device (e.g., transmitter device 110) applies companding transformation 630 to a set of data symbols 305A-305J. The set of data symbols 305A-305J are scattered in roughly a two-dimensional Gaussian distribution around the I-Q plane. In one example, the data symbols 305A-305J are a block of data symbols produced by a UBDM modulation of a standard modulation constellation (e.g., PSK, QAM, etc.).

A transmitter device (e.g., transmitter device 110) applies the companding transformation 630 to the set of data symbols 305A-305J to generate the transformed set of data symbols 635A-635J. The companding transformation 630 reduces the magnitude of data symbols outside the reference magnitude 606 (e.g., data symbol 635G) toward the reference magnitude 606 and increasing the magnitude of data symbols inside the reference magnitude 606 (e.g., data symbols 635A-635F, 635I, and 635J) toward the reference magnitude 606. If an input data symbol (e.g., data symbol 305H) has an input magnitude equal to the reference magnitude 606, then the companding transformation 630 does not change the magnitude of the corresponding output data symbol (e.g., data symbol 635H). The transformed set of data symbols 635A-635J reduces the PAPR of the data transmission by compressing the magnitude of the output data symbols 635A-635J toward the reference magnitude 606, which reduces the peak power required for transmitting the data symbols 635A-635J.

Additionally, the companding transformation 630 moves the output data symbols 635A-635J away from the origin of the I-Q plane, which shifts the continuous, analog signal in the transition between subsequent data symbols (e.g., data symbol 635A and data symbol 635B) away from the origin of the I-Q plane, which brings the average power closer to the reference magnitude 606, further improving the PAPR of the transmitted signal.

In the example shown in FIG. 6A and FIG. 6B, the data symbols 305A-305F, 305I, and 305J each have an input magnitude below the reference magnitude 606, and the companding transformation 630 increases the magnitude of each corresponding data symbol 635A-635F, 635I, and 635J. The data symbol 305G has an input magnitude higher than the reference magnitude 606, and the companding transformation 630 reduces the output magnitude of the corresponding data symbol 635G to be closer to the reference magnitude 606. The data symbol 305H has an input magnitude equal to the reference magnitude 606, and the companding transformation 630 does not alter the output magnitude of the corresponding data symbol 535H.

Because the companding transformation 630 is based on the reference magnitude 606, the transmitter device may share the reference magnitude 606 with a receiver device (e.g., receiver device 120), either through the same communications channel or a separate communications channel. In one example, the receiver device may reverse the companding transformation 630 based on the shared reference magnitude 606, and recover the original data symbols 305A-305J. Alternatively, the receiver device may attempt to recover data from the received data symbols without explicitly reversing the companding transformation 630, but the signal would include some distortion based on the companding transformation 630. However, the receiver device may recover data symbols that may be correlated with the transmitted data (e.g., via quantization of the data symbols, via forward error correction, etc.) despite the added distortion.

Figure 7:
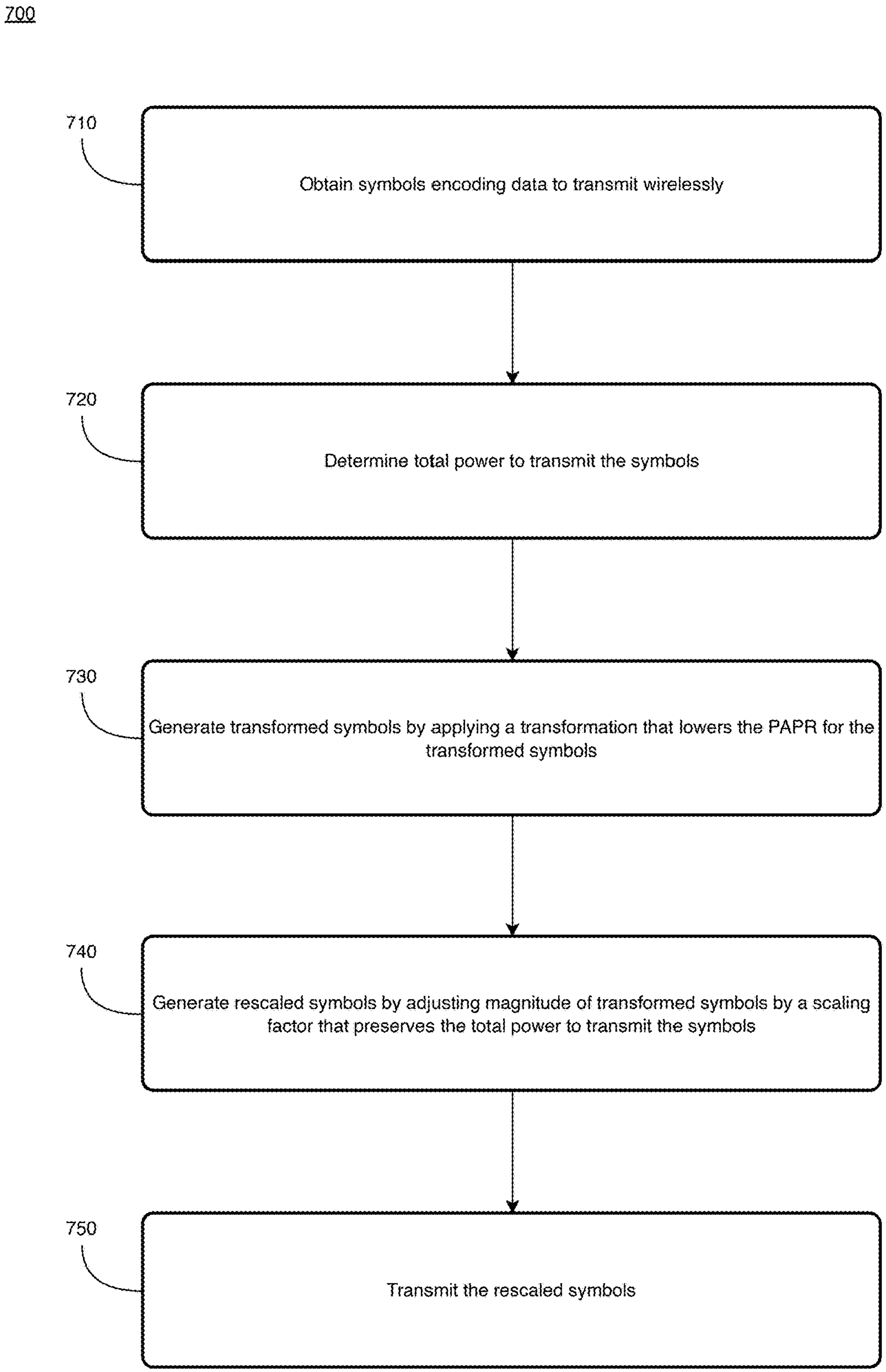
FIG. 7 is a flowchart illustrating operations performed by a wireless device to modify the power characteristics of a wireless transmission, according to an example embodiment.

Referring now to FIG. 7, a flowchart illustrates an example process 700 performed by a transmitter device (e.g., transmitter device 110) to improve the power characteristics of a wireless transmission. At 710, the transmitter device obtains a plurality of symbols encoding data to be wirelessly transmitted. In one example, each symbol of the plurality of symbols is defined by a respective magnitude and a respective phase. In another example, the plurality of symbols may encode the data according to a modulation format (e.g., UBDM, QAM, PSK, etc.).

At 720, the transmitter device determines a total power to transmit the plurality of symbols. In one example, the total power may be based on the magnitude of each symbol in the plurality of symbols. In another example, the total power may be based on a signal that is generated by a sequence of the plurality of symbols in an order.

At 730, the transmitter device generates a plurality of transformed symbols by applying a transformation to the plurality of symbols. The transformation lowers the PAPR for the plurality of transformed symbols by adjusting the respective magnitude of at least one transformed symbol among the plurality of transformed symbols. In one example, the transformation may be independent of the magnitude value of each symbol in the plurality of symbols (e.g., as described with respect to FIG. 3A, FIG. 3B, or FIG. 3C). In another example, the transformation may be dependent on the magnitude value of each symbol in the plurality of symbols (e.g., as described with respect to FIG. 4A, FIG. 4B, FIG. 5A, FIG. 5B, FIG. 6A, or FIG. 6B).

At 740, the transmitter device generates a plurality of rescaled symbols by adjusting the respective magnitude of each transformed symbol in the plurality of transformed symbols by a scaling factor that preserves the total power to transmit the plurality of symbols. At 750, the transmitter device transmits the plurality of rescaled symbols.

Figure 8:
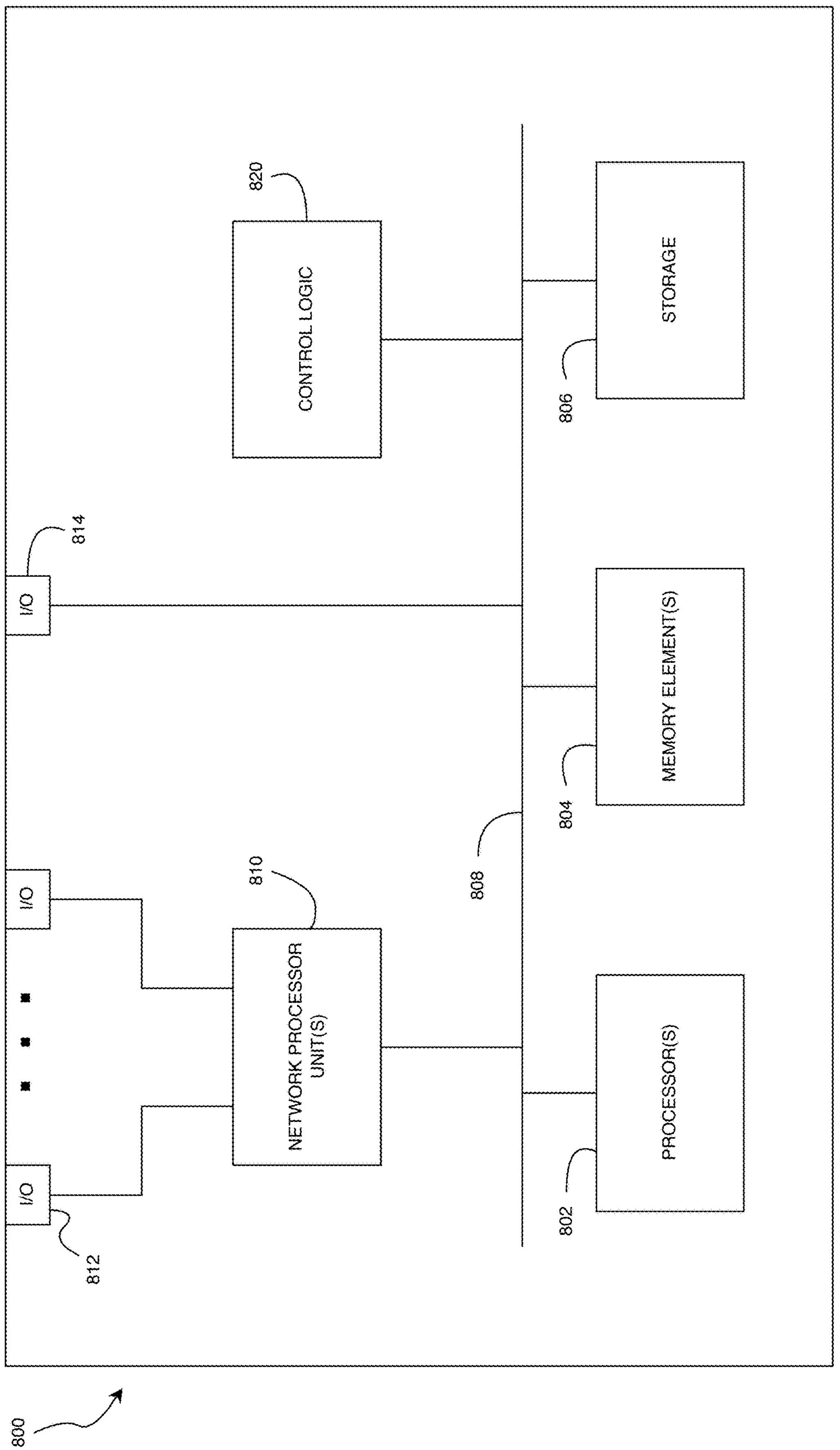
FIG. 8 is a block diagram of a computing device that may be configured to perform the techniques presented herein, according to an example embodiment.

Referring now to FIG. 8, a hardware block diagram depicts a computing device 800 that may perform functions associated with operations described herein in connection with the techniques depicted in FIGS. 1, 2, 3A, 3B, 3C, 4A, 4B, 5A, 5B, 6A, 6B, and 7. In various embodiments, a computing device, such as computing device 800 or any combination of computing devices 800, may be configured as any entity/entities as discussed for the techniques depicted in connection with FIGS. 1, 2, 3A, 3B, 3C, 4A, 4B, 5A, 5B, 6A, 6B, and 7, in order to perform operations of the various techniques discussed herein. In some instances, one or more computing devices 800 (e.g., wireless transmitters, wireless receivers) may be deployed in a cloud or distributed computing environment to perform one or more of the techniques described herein.

In at least one embodiment, the computing device 800 may include one or more processor(s) 802, one or more memory element(s) 804, storage 806, a communication bus 808, one or more network processor unit(s) 810 interconnected with one or more network input/output (I/O) interface(s) 812, and control logic 820. In various embodiments, instructions associated with logic for computing device 800 may overlap in any manner and are not limited to the specific allocation and/or operations described herein.

In at least one embodiment, processor(s) 802 is/are at least one hardware processor configured to execute various tasks, operations, and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information, etc.) from one state or thing to another state or thing. Any of potential processing elements, microprocessors, digital signal processors, floating point gate arrays (FPGAs), graphical processor units (GPUs), secure processors, baseband signal processors, modems, PHY elements, controllers, systems, managers, logic, and/or machines described herein can be construed as being encompassed within the broad term 'processor.'

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, communication bus 808 can be configured as an interface that enables one or more elements of computing device 800 to communicate in order to exchange information and/or data. Communication bus 808 can be implemented with any architecture designed for passing control, data, and/or information between processors, memory elements/storage, peripheral devices, and/or any other hardware and/or software components that may be configured for computing device 800. In at least one embodiment, communication bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface card(s), optical (e.g., Fibre Channel) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc., to facilitate operations for various embodiments described herein. In various embodiments, network I/O interface(s) 812 can be configured as one or more Ethernet port(s), Fibre Channel port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, touch screen, microphone or microphone array, camera, video capture device, and/or other suitable input and/or output device now known or hereafter developed. In some instances, external devices may also include portable computer readable (non-transitory) storage media such as database systems, flash memory drives, portable optical or magnetic disks, and/or other memory cards. In some instances, external devices may include a mechanism to display data to a user, such as a computer monitor, a display screen, an audio speaker, and/or other output device.

In various embodiments, control logic 820, can include instructions that, when executed, cause processor(s) 802 to perform operations, which can include, but not be limited to, providing overall control operations of computing devices; interacting with other entities, systems, etc., described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), secure memory module, tamper-proof memory, application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure; all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in an Application Specific Integrated Circuit (ASIC), Digital Signal Processing (DSP) instructions, software (potentially inclusive of object code and/or source code), etc.) for execution by one or more processor(s), and/or other similar machines. Generally, memory element(s) 804 and/or storage 806 may store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, and/or the like that are executed to carry out operations in accordance with the teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, flash drives, and/or smart cards that can be inserted and/or otherwise connected to a computing device for transfer onto another computer readable storage medium.

Variations and Implementations

As used herein, a 'transmitter' (or 'signal transmitter') refers to any collection of components that are used in the transmission of signals, including any combination of, but limited to, one or more: antennas, amplifiers, cables, digital-to-analog converters, analog-to-digital converters, filters, up-converters, encoders, modulators, multiplexers, processors (e.g., for reading bits and/or mapping of bits to a baseband), control circuitry, oscillators, etc. Similarly, as used herein, a 'receiver' (or 'signal receiver') refers to any collection of components that are used in receiving signals, including any combination of, but limited to, one or more: antennas, amplifiers, cables, analog-to-digital converters, digital-to-analog converters, filters, down-converters, decoders, demodulators, demultiplexers, processors, detectors, control circuitry, oscillators, etc. Further the transmitter and receiver may be implemented using analog components, digital components, or a mix of analog and digital components. Further the transmitter and receiver may use analog signals, digital signals, or a mix of analog and digital signals.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium.

Such networks can include, but are not limited to, any local area network (LAN), virtual LAN (VLAN), wide area network (WAN) (e.g., the Internet), software defined WAN (SD-WAN), wireless local area (WLAN) access network, wireless wide area (WWAN) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/6G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly be connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of, 'one or more of, 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and 'one or more of can be represented using the '(s)' nomenclature (e.g., one or more element(s)).

In summary, the techniques presented herein apply transformations to data encoded in symbols for wireless transmission. The transformations modify the data symbols to mitigate distortion caused by amplifier nonlinearity. Each of the transformations decrease the peak power (i.e., the peak magnitude of the data symbols) to improve the performance (e.g., PAPR) of transmissions from wireless devices with nonlinear amplifiers. Additionally, the transformations may also narrow the width of the distribution of data symbols to further improve the PAPR of the data signal by effectively increasing the average power.

In some aspects, the techniques described herein relate to a method including: obtaining a plurality of symbols encoding data to transmit wirelessly, wherein each symbol of the plurality of symbols includes a respective magnitude; determining a total power to transmit the plurality of symbols; generating a plurality of transformed symbols by applying a transformation to the plurality of symbols, the transformation lowering a Peak to Average Power Ratio (PAPR) for the plurality of transformed symbols by adjusting the respective magnitude of at least one transformed symbol among the plurality of transformed symbols; generating a plurality of rescaled symbols by adjusting the respective magnitude of each transformed symbol in the plurality of transformed symbols by a scaling factor that preserves the total power to transmit the plurality of symbols; and transmitting the plurality of rescaled symbols.

In some aspects, the techniques described herein relate to a method, wherein applying the transformation includes adding a predetermined magnitude value to the respective magnitude of each symbol in the plurality of symbols.

In some aspects, the techniques described herein relate to a method, wherein applying the transformation includes adding a sinusoid of predetermined amplitude and frequency to each symbol in the plurality of symbols.

In some aspects, the techniques described herein relate to a method, further including encoding additional data in the sinusoid.

In some aspects, the techniques described herein relate to a method, wherein encoding the additional data in the sinusoid includes encoding the additional data according to a Minimum Shift Key (MSK) encoding format.

In some aspects, the techniques described herein relate to a method, wherein applying the transformation includes applying a limit to clip the respective magnitude of each symbol in the plurality of symbols to a maximum magnitude value.

In some aspects, the techniques described herein relate to a method, wherein the limit is a soft limit.

In some aspects, the techniques described herein relate to a method, wherein applying the transformation includes: determining a reference magnitude level; amplifying the respective magnitude of any symbol in the plurality of symbols with the respective magnitude below the reference magnitude level; and attenuating the respective magnitude of any symbol in the plurality of symbols with the respective magnitude above the reference level.

In some aspects, the techniques described herein relate to a method, wherein the plurality of symbols are distributed according to a two-dimensional Gaussian distribution in a complex plane.

In some aspects, the techniques described herein relate to a method, wherein the plurality of symbols are encoded according to a Universal Braid Division Multiplexing (UBDM) format.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

obtaining a plurality of symbols encoding data to transmit wirelessly, wherein each symbol of the plurality of symbols includes a respective magnitude;

determining a total power to transmit the plurality of symbols;

generating a plurality of transformed symbols by applying a transformation to the plurality of symbols, the transformation lowering a Peak to Average Power Ratio (PAPR) for the plurality of transformed symbols by adjusting the respective magnitude of at least one transformed symbol among the plurality of transformed symbols;

generating a plurality of rescaled symbols by adjusting the respective magnitude of each transformed symbol in the plurality of transformed symbols by a scaling factor that preserves the total power to transmit the plurality of symbols; and transmitting the plurality of rescaled symbols.

2. The method of claim 1, wherein applying the transformation comprises adding a predetermined magnitude value to the respective magnitude of each symbol in the plurality of symbols.

3. The method of claim 1, wherein applying the transformation comprises adding a sinusoid of predetermined amplitude and frequency to each symbol in the plurality of symbols.

4. The method of claim 3, further comprising encoding additional data in the sinusoid.

5. The method of claim 4, wherein encoding the additional data in the sinusoid comprises encoding the additional data according to a Minimum Shift Key (MSK) encoding format.

6. The method of claim 1, wherein applying the transformation comprises applying a limit to clip the respective magnitude of each symbol in the plurality of symbols to a maximum magnitude value.

7. The method of claim 6, wherein the limit is a soft limit.

8. The method of claim 1, wherein applying the transformation comprises:

determining a reference magnitude level;

amplifying the respective magnitude of any symbol in the plurality of symbols with the respective magnitude below the reference magnitude level; and attenuating the respective magnitude of any symbol in the plurality of symbols with the respective magnitude above the reference magnitude level.

9. The method of claim 1, wherein the plurality of symbols are distributed according to a two-dimensional Gaussian distribution in a complex plane.

10. The method of claim 9, wherein the plurality of symbols are encoded according to a Universal Braid Division Multiplexing (UBDM) format.

11. An apparatus comprising:

a wireless transmitter module configured to transmit wireless signals; and a processor configured to:

obtain a plurality of symbols encoding data to transmit wirelessly, wherein each symbol of the plurality of symbols includes a respective magnitude;

determine a total power to transmit the plurality of symbols;

generate a plurality of transformed symbols by applying a transformation to the plurality of symbols, the transformation lowering a Peak to Average Power Ratio (PAPR) for the plurality of transformed symbols by adjusting the respective magnitude of at least one transformed symbol among the plurality of transformed symbols;

generate a plurality of rescaled symbols by adjusting the respective magnitude of each transformed symbol in the plurality of transformed symbols by a scaling factor that preserves the total power to transmit the plurality of symbols; and cause the wireless transmitter module to transmit the plurality of rescaled symbols.

12. The apparatus of claim 11, wherein the processor is further configured to apply the transformation by adding a predetermined magnitude value to the respective magnitude of each symbol in the plurality of symbols.

13. The apparatus of claim 11, wherein the processor is further configured to apply the transformation by adding a sinusoid of predetermined amplitude and frequency to each symbol in the plurality of symbols.

14. The apparatus of claim 13, wherein the processor is further configured to encode additional data in the sinusoid.

15. The apparatus of claim 11, wherein the processor is further configured to apply the transformation by applying a limit to clip the respective magnitude of each symbol in the plurality of symbols to a maximum magnitude value.

16. The apparatus of claim 11, wherein the processor is further configured to apply the transformation by:

determining a reference magnitude level;

amplifying the respective magnitude of any symbol in the plurality of symbols with the respective magnitude below the reference magnitude level; and attenuating the respective magnitude of any symbol in the plurality of symbols with the respective magnitude above the reference magnitude level.

17. One or more non-transitory computer readable storage media encoded with software comprising computer executable instructions and, when the software is executed on a processor of a transmitter device, operable to cause the processor to:

obtain a plurality of symbols encoding data to transmit wirelessly, wherein each symbol of the plurality of symbols includes a respective magnitude;

determine a total power to transmit the plurality of symbols;

generate a plurality of transformed symbols by applying a transformation to the plurality of symbols, the transformation lowering a Peak to Average Power Ratio (PAPR) for the plurality of transformed symbols by adjusting the respective magnitude of at least one transformed symbol among the plurality of transformed symbols;

generate a plurality of rescaled symbols by adjusting the respective magnitude of each transformed symbol in the plurality of transformed symbols by a scaling factor that preserves the total power to transmit the plurality of symbols; and cause the transmitter device to transmit the plurality of rescaled symbols.

18. The one or more non-transitory computer readable storage media of claim 17, wherein the computer executable instructions further cause the processor to apply the transformation by adding a predetermined signal to each symbol in the plurality of symbols.

19. The one or more non-transitory computer readable storage media of claim 17, wherein the computer executable instructions further cause the processor to apply the transformation by applying a limit to clip the respective magnitude of each symbol in the plurality of symbols to a maximum magnitude value.

20. The one or more non-transitory computer readable storage media of claim 17, wherein the computer executable instructions further cause the processor to apply the transformation by:

determining a reference magnitude level;

amplifying the respective magnitude of any symbol in the plurality of symbols with the respective magnitude below the reference magnitude level; and attenuating the respective magnitude of any symbol in the plurality of symbols with the respective magnitude above the reference magnitude level.

* * * * *